(12) United States Patent
Spangler et al.

(10) Patent No.: US 10,975,710 B2
(45) Date of Patent: Apr. 13, 2021

(54) COOLING CIRCUIT FOR GAS TURBINE ENGINE COMPONENT

(71) Applicant: United Technologies Corporation, Farmington, CT (US)

(72) Inventors: Brandon W. Spangler, Vernon, CT (US); Dominic Mongillo, West Hartford, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 371 days.

(21) Appl. No.: 16/210,393

(22) Filed: Dec. 5, 2018

(65) Prior Publication Data

US 2020/0182152 A1   Jun. 11, 2020

(51) Int. Cl.
| | | |
|---|---|---|
| *F01D 5/18* | (2006.01) | |
| *F01D 9/06* | (2006.01) | |
| *F01D 25/12* | (2006.01) | |
| *F02C 7/12* | (2006.01) | |

(52) U.S. Cl.
CPC ............ *F01D 9/065* (2013.01); *F01D 5/187* (2013.01); *F01D 25/12* (2013.01); *F02C 7/12* (2013.01)

(58) Field of Classification Search
CPC ........................ F01D 5/187; F05D 2240/304
See application file for complete search history.

(56) References Cited

U.S. PATENT DOCUMENTS

| | | | | | |
|---|---|---|---|---|---|
| 3,819,295 | A | * | 6/1974 | Hauser | F01D 5/187 416/97 R |
| 3,934,322 | A | * | 1/1976 | Hauser | B23P 15/04 29/889.721 |
| 4,090,810 | A | * | 5/1978 | Dakin | F01D 5/185 416/96 R |
| 5,413,463 | A | * | 5/1995 | Chiu | F01D 5/187 416/95 |
| 5,503,529 | A | * | 4/1996 | Anselmi | F01D 5/186 416/97 R |

(Continued)

FOREIGN PATENT DOCUMENTS

| | | |
|---|---|---|
| EP | 1091092 | 4/2001 |
| EP | 1749972 | 7/2007 |

(Continued)

OTHER PUBLICATIONS

EP Search Report for EP Application No. 192127272 dated Apr. 17, 2020.

*Primary Examiner* — Eldon T Brockman
(74) *Attorney, Agent, or Firm* — Carlson, Gaskey & Olds, P.C.

(57) ABSTRACT

A component for a gas turbine engine includes a wall portion that includes an interior surface and an exterior surface. At least one cooling circuit is defined by the wall portion and includes a plurality of pedestals that extend across the cooling circuit. A width of the cooling circuit increases or decreases in a downstream direction. At least one cooling fluid inlet extends through the interior surface and is in fluid communication with the cooling circuit. At least one cooling fluid outlet extends through the exterior surface and is in fluid communication with the cooling circuit.

12 Claims, 9 Drawing Sheets

(56) References Cited

U.S. PATENT DOCUMENTS

| | | | |
|---|---|---|---|
| 6,382,907 B1* | 5/2002 | Bregman | F01D 5/187 415/115 |
| 6,514,042 B2* | 2/2003 | Kvasnak | F01D 5/187 415/115 |
| 6,773,231 B2* | 8/2004 | Bunker | F01D 5/225 416/97 R |
| 7,021,893 B2* | 4/2006 | Mongillo, Jr. | F01D 5/187 415/115 |
| 7,270,515 B2* | 9/2007 | Liang | F01D 5/187 416/97 R |
| 7,377,748 B2* | 5/2008 | Mongillo, Jr. | F01D 5/187 416/97 R |
| 7,572,103 B2* | 8/2009 | Walters | F01D 5/187 416/96 R |
| 7,607,890 B2 | 10/2009 | Cunha et al. | |
| 7,806,659 B1* | 10/2010 | Liang | F01D 5/187 416/97 R |
| 8,137,068 B2* | 3/2012 | Surace | B22C 7/02 416/97 R |
| 9,995,145 B2 | 6/2018 | Propheter-Hinckley et al. | |
| 10,145,246 B2* | 12/2018 | Lewis | F01D 5/147 |
| 10,190,420 B2* | 1/2019 | King | F01D 5/187 |
| 10,196,901 B2* | 2/2019 | Wong | F01D 25/12 |
| 10,208,603 B2* | 2/2019 | Xu | F01D 9/065 |
| 10,641,103 B2* | 5/2020 | Spangler | F02C 7/18 |
| 2002/0021966 A1* | 2/2002 | Kvasnak | F01D 5/187 416/97 R |
| 2005/0191167 A1* | 9/2005 | Mongillo, Jr. | F01D 5/187 415/115 |
| 2007/0031252 A1* | 2/2007 | Walters | F28F 13/08 416/97 R |
| 2007/0166161 A1* | 7/2007 | Devore | F01D 5/186 416/97 R |
| 2007/0224033 A1* | 9/2007 | Mongillo, Jr. | B22C 9/10 415/115 |
| 2011/0064585 A1 | 3/2011 | Amguisola Mcfeat | |
| 2012/0163992 A1* | 6/2012 | Propheter-Hinckley | B22C 9/24 416/97 R |
| 2015/0147158 A1 | 5/2015 | Wang | |
| 2016/0169003 A1* | 6/2016 | Wong | F01D 9/041 415/1 |
| 2016/0230565 A1* | 8/2016 | King | F01D 5/18 |
| 2017/0234142 A1* | 8/2017 | Benson | F01D 5/186 60/806 |

FOREIGN PATENT DOCUMENTS

| | | |
|---|---|---|
| EP | 3382151 | 10/2018 |
| WO | 20150116338 | 8/2015 |

* cited by examiner

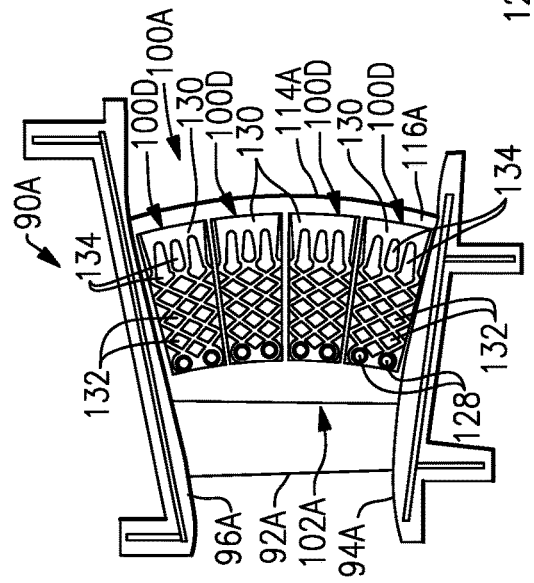
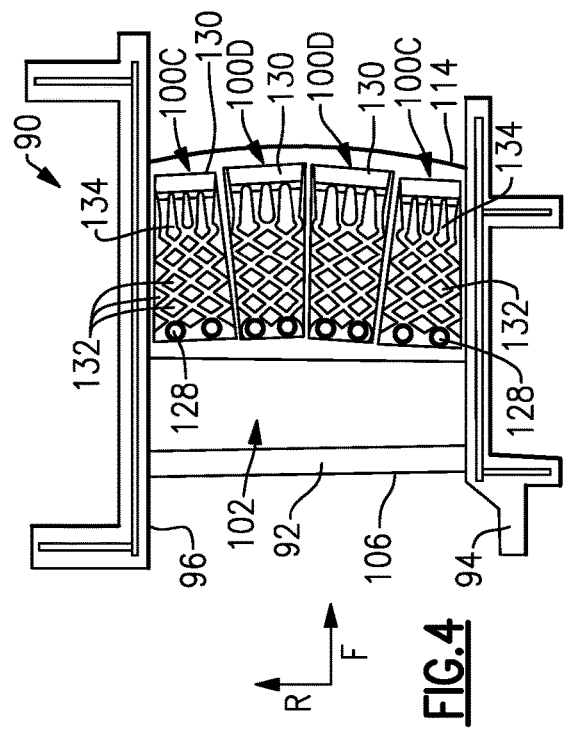
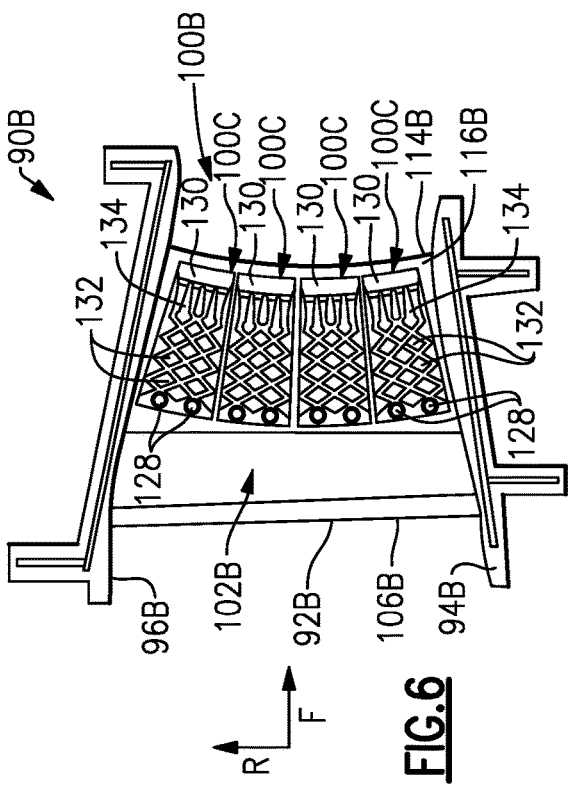
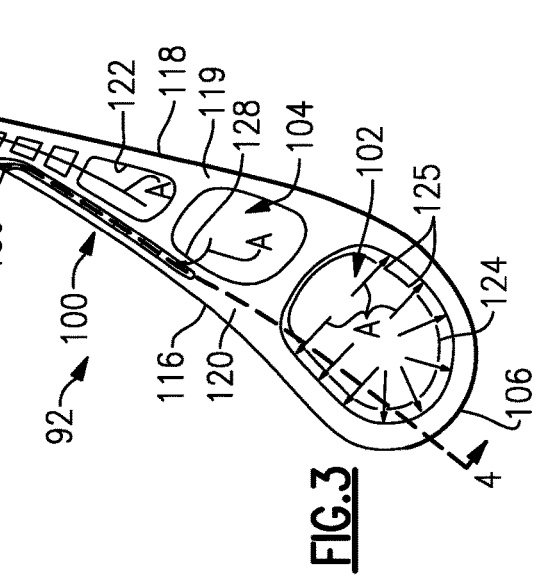

COOLING CIRCUIT FOR GAS TURBINE ENGINE COMPONENT

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Gas turbine engine components, such as combustor panels, blades, or vanes, are operated in high temperature environments. To avoid deterioration in the components resulting from their exposure to high temperatures, it is necessary to provide cooling circuits within the components. In particular, turbine blades and vanes are subjected to high thermal loads on both the suction and pressure sides of the airfoils. The regions of the airfoils having the highest thermal load can differ depending on engine design and specific operating conditions.

Minicore technology offers the potential to provide higher specific cooling passages for turbine components such as blades, vanes, and combustor panels. Minicore technology utilizes refractory metal cores to allow cooling circuits to be placed just under the surface of the hot wall through which cooling air flows and is expelled into the gas path. However, state of the art cooling circuits made using refractory metal cores has limits on the amount of cooling that can be provided to a component and the temperature the component can withstand.

SUMMARY

In one exemplary embodiment, a component for a gas turbine engine includes a wall portion that includes an interior surface and an exterior surface. At least one cooling circuit is defined by the wall portion and includes a plurality of pedestals that extend across the cooling circuit. A width of the cooling circuit increases or decreases in a downstream direction. At least one cooling fluid inlet extends through the interior surface and is in fluid communication with the cooling circuit. At least one cooling fluid outlet extends through the exterior surface and is in fluid communication with the cooling circuit.

In a further embodiment of any of the above, the wall portion defines one of a blade, a vane, a BOAS, or a combustor panel.

In a further embodiment of any of the above, the plurality of pedestals define a plurality of pedestal rows that each include multiple pedestals and extend between the at least one cooling fluid inlet and at least one cooling fluid outlet.

In a further embodiment of any of the above, a center row of the plurality of pedestal rows is symmetric about a middle centerline that extends through a plurality of pedestals along the center row.

In a further embodiment of any of the above, a first row of the plurality of pedestal rows is located on a first side of the center row and includes a first centerline that extends through a plurality of pedestals along the first row that is non-parallel to the middle centerline.

In a further embodiment of any of the above, a second row of the plurality of pedestals is located on a second side of the center row and includes a second centerline that extends through a plurality of pedestals along the second row that is non-parallel to the middle centerline.

In a further embodiment of any of the above, the first centerline and the second centerline converge with the middle centerline in a downstream direction.

In a further embodiment of any of the above, the plurality of pedestals define a first plurality of fluid passages that each have a first centerline that converge in a forward direction. A second plurality of fluid passages each have a second centerline that converge in the forward direction.

In a further embodiment of any of the above, the first centerline and the second centerline diverge with the middle centerline in a downstream direction.

In a further embodiment of any of the above, the plurality of pedestals define a first plurality of fluid passages that each have a first centerline that diverge in a forward direction. A second plurality of fluid passages each have a second centerline that diverge in the forward direction.

In a further embodiment of any of the above, each pedestal in the plurality of pedestals contains a width. The width of each subsequent pedestal from at least one cooling fluid inlet to at least one cooling fluid outlet decreases such that a minimum distance between adjacent pedestals is constant throughout the cooling circuit.

In a further embodiment of any of the above, the first row of pedestals and the second row of pedestals each include an outer portion that is skewed relative to an inner portion.

In a further embodiment of any of the above, the first row of pedestals and the second row of pedestals each include a scalloped star cross-section.

In a further embodiment of any of the above, each pedestal in the plurality of pedestals contains a width. The width of each subsequent pedestal from at least one cooling fluid inlet to at least one cooling fluid outlet increases such that a minimum distance between adjacent pedestals is constant throughout the cooling circuit.

In a further embodiment of any of the above, a downstream edge of the component is convex. At least one cooling circuit includes a plurality of cooling circuits that each include a first centerline and a second centerline that diverge with a middle centerline in a downstream direction.

In a further embodiment of any of the above, a downstream edge of the component is convex. At least one cooling circuit includes at least one diverging cooling circuit that has a first centerline and a second centerline that diverge with a middle centerline in a downstream direction. At least one converging cooling circuit has a first centerline and a second centerline that converge with a middle centerline in the downstream direction.

In a further embodiment of any of the above, a downstream edge of the component is concave. At least one cooling circuit includes a plurality of converging cooling circuits that each have a first centerline and a second centerline that converge with a middle centerline in a downstream direction.

In another exemplary embodiment, a method of cooling a component for a gas turbine engine comprising the steps of directing a cooling fluid into a cooling circuit in a wall portion of component. The cooling fluid is directed around a plurality of pedestals that extend across the cooling fluid circuit. A width of the cooling circuit increases or decreases in a downstream direction. The cooling fluid is directed out of the component through a fluid outlet.

In a further embodiment of any of the above, the plurality of pedestals includes an odd number of rows of pedestals that extend between a cooling fluid inlet and a cooling fluid outlet. A center row of pedestals of the odd number of pedestal rows is symmetric about a middle centerline that extends through the center row of pedestals.

In a further embodiment of any of the above, a first row of pedestals on a first side of the center row of pedestals extends along a first centerline that is non-parallel to the middle centerline. A second row of pedestals on a second side of the center row of pedestals extends along a second centerline that is non-parallel to the middle centerline.

BRIEF DESCRIPTION OF THE DRAWINGS

FIG. 3 is a cross-sectional view of an example vane along line 3-3 of FIG. 2.

FIG. 4 is a cross-sectional view of the vane along line 4-4 of FIG. 3.

FIG. 5 is a cross-sectional view of another example vane.

FIG. 6 is a cross-sectional view of yet another example vane.

DETAILED DESCRIPTION

Figure 1:
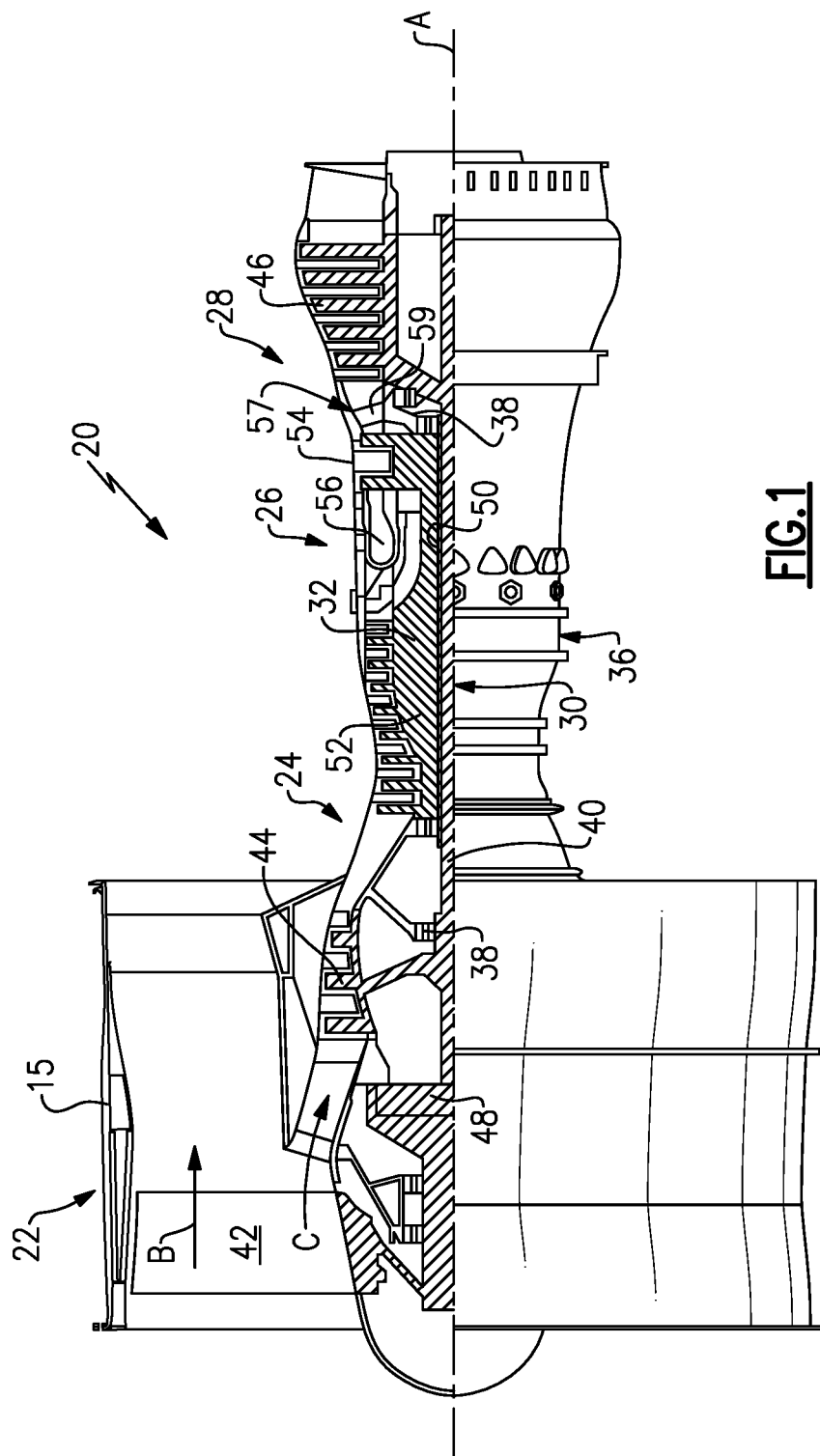
FIG. 1 is a schematic view of an example gas turbine engine according to a non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2:
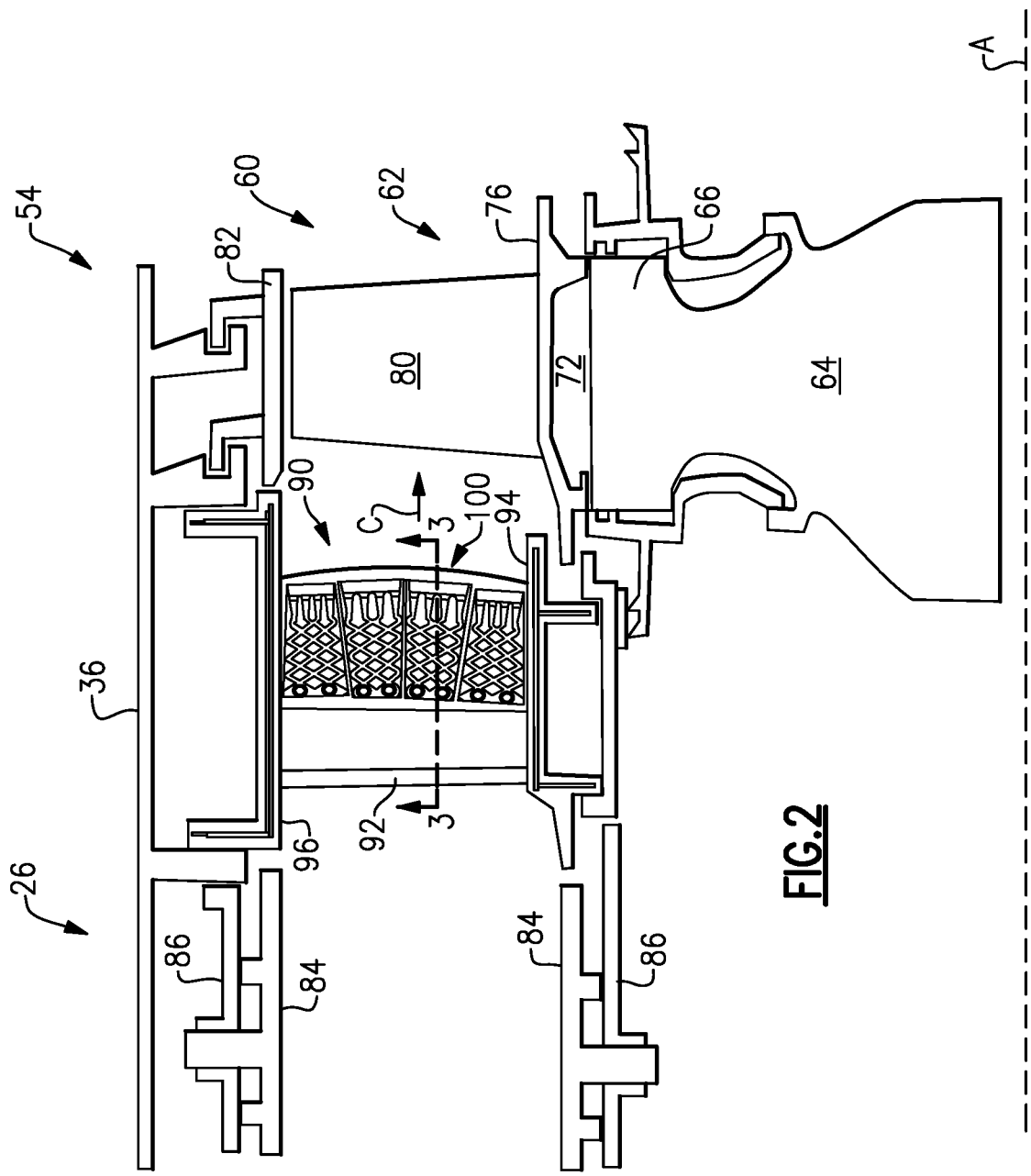
FIG. 2 is a schematic view of an example turbine section.

FIG. 2 illustrates an enlarged schematic view of the combustor section 26 and the high pressure turbine 54, however, other sections of the gas turbine engine 20 could benefit from this disclosure, such as the compressor section 24 or low pressure turbine 46. In the illustrated example, the high pressure turbine 54 includes a one-stage turbine section having a first rotor assembly 60. In another example, the high pressure turbine 54 could include a two-stage high pressure turbine section having more than one rotor assembly.

The first rotor assembly 60 includes a plurality of first rotor blades 62 circumferentially spaced around a first disk 64 to form an array of blades. Each of the plurality of first rotor blades 62 include a first root portion 72, a first platform 76, and a first airfoil 80. The first root portion 72 on each of the blades 62 is received within a respective first rim 66 of the first disk 64. The first airfoil 80 extends radially outward toward a blade outer air seal (BOAS) 82. The BOAS 82 is attached to the engine static structure 36.

The plurality of first rotor blades 62 are disposed in the core flow path C that is pressurized in the compressor section 24 then heated to a working temperature in the combustor section 26. The first platform 76 separates a gas path side inclusive of the first airfoils 80 from a non-gas path side inclusive of the first root portion 72.

A plurality of vanes 90 are located axially upstream of the plurality of first rotor blades 62. Each of the plurality of vanes 90 includes at least one airfoil 92 that extends between a respective vane inner platform 94 and a vane outer platform 96. The combustor section 26 is located immediately upstream of the plurality of vanes 90 and includes a combustor panel 84 at least partially surrounded by a combustor liner 86.

FIG. 3 is a cross-sectional view taken along line 3-3 of FIG. 2. The airfoil 92 includes a leading edge 106, a trailing edge 114, a pressure side surface 116, and a suction side surface 118. A leading edge feed cavity 102 is located adjacent the leading edge 106 and a trailing edge feed cavity 122 is located adjacent the trailing edge 114. In the illustrated example, the leading edge feed cavity 102 includes a baffle 124 that directs cooling air A through impingement openings 125 towards an interior surface defining the leading edge feed cavity 102. The trailing edge feed cavity 122 supplies cooling air A to a trailing edge cooling slot 126 located at or adjacent the trailing edge 114 of the airfoil 92.

A cooling circuit 100 is located in a pressure side wall 120. The pressure side wall 120 includes the pressure side surface 116 on an exterior surface of the airfoil 92 and interior surfaces defining at least a portion of the leading edge feed cavity 102, an intermediate feed cavity 104, and the trailing edge feed cavity 122. In the illustrated example, the cooling circuit 100 is fed with cooling air from the intermediate feed cavity 104, which separates the leading edge feed cavity 102 from the trailing edge feed cavity 122. However, in another example, the cooling circuit 100 could be fed cooling air A from the leading edge feed cavity 102 or the trailing edge feed cavity 122. Furthermore, the cooling circuit 100 could also be located in a suction side wall 119 adjacent the suction side surface 118 instead of or in addition to cooling circuits in the pressure side wall 120.

FIG. 4 illustrates a cross-sectional view of the airfoil 92 along line 4-4 of FIG. 3. The cooling circuits 100 are fed by inlets 128 that are in fluid communication with the intermediate feed cavity 104 (FIG. 3) and the cooling circuits 100 direct the cooling air out of the airfoil 92 through cooling fluid apertures 130, located along the pressure side surface 116 of the airfoil 92. The apertures 130, may comprise of constant, converging, and/or diverging slot type geometry that may be, but are not limited to square, rectangular, elliptical, oval, and/or racetrack shapes.

The cooling circuits 100 include a plurality of pedestals 132 and elongated flow directing features 134 that direct the cooling fluid traveling through the cooling circuit 100 to the aperture 130. In the illustrated example, the pedestals 132 create vorticities within the cooling flow, generating turbulent mixing of the cooling air as the cooling fluid migrates through the cooling circuit 100. The increased turbulence of the cooling air fluid thereby improves the mixing of the cooling air A along the hot exterior pressure side wall 120 of the airfoil 92, thereby enhancing the internal convective heat transfer between the working cooling fluid A, and the airfoil pressure side wall 120.

As shown in FIG. 4 the vane 90 includes a trailing edge 114 that is convex in shape, along the chord-wise and/or streamwise direction F, of the hot freestream gas flow. The cooling circuits 100 include diverging cooling circuits 100D that increase in width in a downstream direction and converging cooling circuits 100C that decrease in width in a downstream direction. In the illustrated example, the vane 90 includes two diverging cooling circuits 100D with one converging cooling circuits 100C on opposite sides of the two diverging cooling circuits 100D. The variation in width of the diverging cooling circuits 100D and converging cooling circuits 100C allows for increased cooling coverage over the pressure side surface 116 while following the convex profile of the trailing edge 114. Also the inner platform 94 and the outer platform 96 are generally parallel to each other such that a radial dimension of the airfoil 92 is generally constant from the airfoil leading edge 106 to the airfoil trailing edge 114.

FIG. 5 is a cross-sectional view of another example vane 90A. The vane 90A is similar to the vane 90 except where described below or shown in the Figures. The vane 90A includes a convex trailing edge 114A, an inner platform 94A, and an outer platform 96A. The inner platform 94A and the outer platform 96A expand radially in a direction, R, along a downstream chord-wise and/or streamwise direction, F of the hot freestream gas flow, such that a radial dimension of the airfoil 92A increases. In the illustrated example, the airfoil 92A includes four diverging cooling circuits 100D. By having the diverging cooling circuits 100D along pressure side surface 116A of the airfoil 92A, the diverging cooling circuits 100D are able to cover a greater portion of the pressure side surface 116A of the airfoil 92A while still being able to follow the convex profile of a trailing edge 114A.

FIG. 6 is a cross-sectional view of yet another example vane 90B. The vane 90B is similar to the vane 90 except where described below or shown in the Figures. The vane 90B includes a concave trailing edge 114B, an inner platform 94B, and an outer platform 96B. The inner and outer platforms 94B, 96B converge in a downstream chord-wise and/or streamwise direction of the hot freestream gas flow, F such that a radial dimension of the airfoil 92B decreases. In the illustrated example, the airfoil 92B includes four converging cooling circuits 100C. By having four converging cooling circuits 100C along pressure side surface 116B of the airfoil 92, the converging cooling circuits 100C are able to cover a greater portion of the pressure side surface 116B of the airfoil 92B while still being able to follow a profile of a trailing edge 114B of the airfoil 92B.

Figure 7:
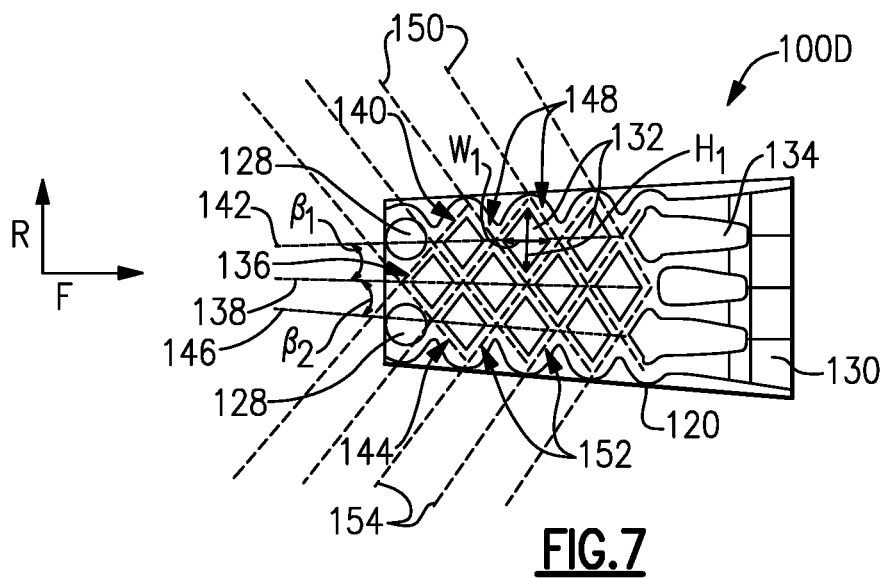
FIG. 7 is an enlarged view of an example diverging cooling circuit.

FIG. 7 illustrates an enlarged view of the diverging cooling circuit 100D in cross section. The diverging cooling circuit 100D includes the pedestals 132 with the flow directing features 134 downstream of the pedestals 132. In the illustrated example, the pedestals 132 are arranged into rows of pedestals 132 with a center row 136 of pedestals 132 extending along a middle centerline 138 that bisect the cooling circuit 100D. The pedestals 132 along the center row 136 are also symmetric about the middle centerline 138.

A first row 140 of the pedestals 132 is located on a first side of the center row 136. A first centerline 142 extends through the pedestals 132 along the first row 140 and the first centerline 142 is non-parallel to the middle centerline 138. A second row 144 of the pedestals 132 is located on a second side of the center row 136. A second centerline 146 extends through the pedestals 132 along the second row 144 and is non-parallel to the middle centerline 138. In the illustrated example, the first centerline 142 and the second centerline 146 diverge from the middle centerline 138 in a downstream direction toward the aperture 130.

The pedestals 132 and/or the flow directing features 134 define a first plurality of fluid passages 148 arranged in angled rows each having a first passage centerline 150 and a second plurality of fluid passages 152 arranged in angled rows each having a second passage centerline 154. The first plurality of fluid passages 148 intersect the second plurality of fluid passages 152 and upstream ones of the first and second plurality of passages 148, 152 have generally the same cross-sectional area compared to downstream ones of the first and second plurality of passages 148, 152. Moreover, each of the first passage centerlines 150 are non-parallel and diverge in a forward or upstream direction, as do each of the second passage centerlines 154.

It should be recognized that the rate of radial diffusion of the diverging cooling circuit 100D is dependent on the relative angle, $\beta_1$, formed between the middle centerline 138 and the first centerline 142 and the relative angle, $\beta_2$, formed between the middle centerline 138 and the second centerline 146. Although the diverging cooling circuit shown in FIG. 7 is axisymmetric, it should be understood that the diffusion angles $\beta_1$ and $\beta_2$ may not be equivalent and may vary independently from one another depending on the streamwise and radial distribution of the external heat transfer coefficients, gas temperature, and local heat flux.

Furthermore the extent of the radial diffusion of the diverging cooling circuit 100D may also controlled by the number of pedestals features defined within each of the streamwise pedestal rows within the diverging cooling circuit 100D. The number or quantity of pedestals within each row, as well as, the number of pedestal rows in the streamwise direction may be increased or decreased depending on cooling flow, pressure drop, and cooling air heat pickup, and slot film effectiveness considerations.

Figure 7A:
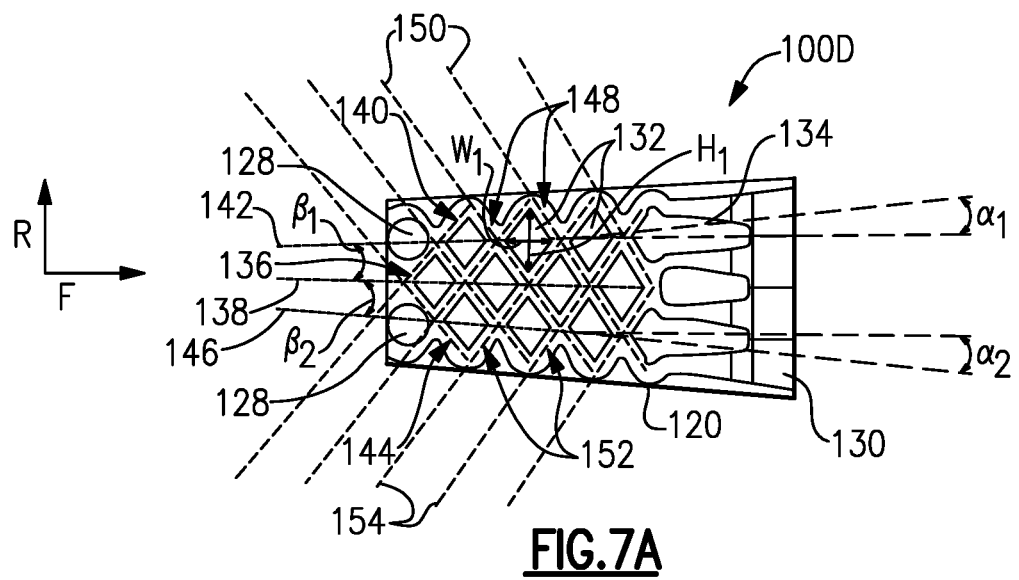
FIG. 7A is another enlarged view of the example diverging cooling circuit.

For example an arrangement of pedestals may consist, of multiple rows, of an alternating 2 and 3 pedestals per row pattern, in the streamwise direction, F, toward an array of 5 flow directing features 134, and the exit apertures 130. Additionally it is important to note that the orientation of the flow directing features 134 may be oriented in a non-axial direction and may each be positioned having unique orientation angles $\alpha_1$, $\alpha_2$, etc. (non-parallel relative to the middle centerline 138 of the diverging cooling circuit 100D) as shown in FIG. 7A.

Alternatively and/or additionally the extent of radial diffusion of the diverging cooling circuit 100D may also be controlled by the aspect ratio of the pedestal features, in that the height, H, and width, W, may be uniquely varied throughout the pedestal array in both the radial direction within a row, as well as, between successive pedestal rows in the streamwise direction, in order to obtain the relative spacing and proportions necessary to generally maintain the same flow area in both the radial and streamwise directions along the plurality of first cooling passages 148 and the plurality of second cooling passages 152. In this sense the, an optimal balance can be achieved between the wetted convective surface area of the cooling passages 148 and 152, and the conduction area of the pedestal features 132.

Figure 8:
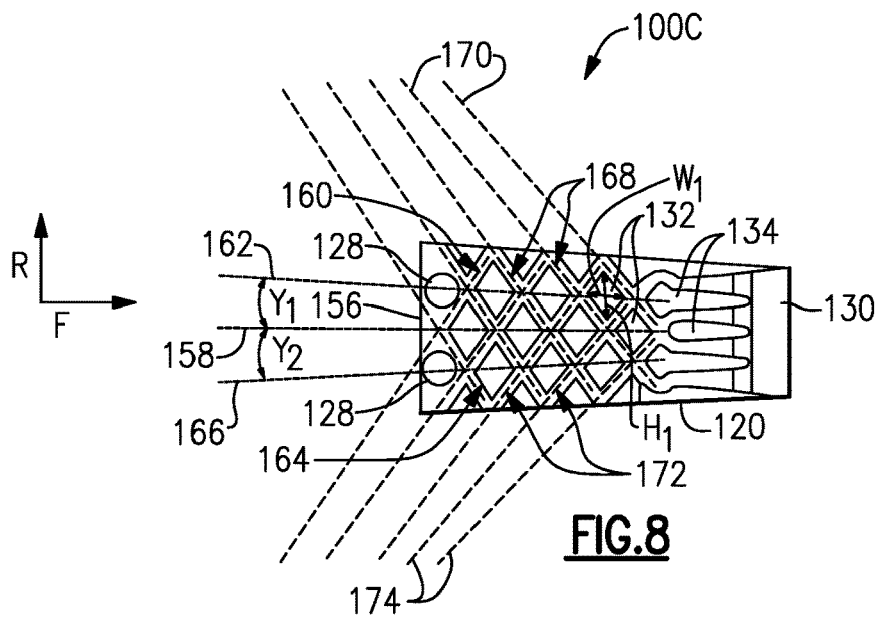
FIG. 8 is an enlarged view of an example converging cooling circuit.

FIG. 8 illustrates an enlarged view of the converging cooling circuit 100C in cross section. In the illustrated example, the pedestals 132 are arranged into rows of pedestals 132 with a center row 156 of pedestals 132 extending along a middle centerline 158 that bisect the converging cooling circuit 100C. The pedestals 132 along the center row 156 are symmetric about the middle centerline 158.

A first row 160 of pedestals 132 is located on a first side of the center row 156. A first centerline 162 extends through the pedestals 132 along the first row 160 that is non-parallel to the middle centerline 158. A second row 164 of the pedestals 132 is located on a second side of the center row 156 and includes a second centerline 166 extending through the pedestals 132 along the second row 164 that is non-parallel to the middle centerline 158. In the illustrated example, the first centerline 162 and the second centerline 166 converge with the middle centerline 158 in a downstream direction toward the aperture 130.

The pedestals 132 and the flow directing features 134 define a first plurality of fluid passages 168 arranged in angled rows each having a first passage centerline 170 and a second plurality of fluid passages 172 arranged in angled rows each having a second passage centerline 174. The first plurality of fluid passages 168 intersect the second plurality of fluid passages 172 and upstream ones of the first and second plurality of passages 168, 172 have generally the same cross-sectional area compared to downstream ones of the first and second plurality of passages 168, 172. Moreover, each of the first passage centerlines 170 are non-parallel and converge in a forward or upstream direction, as do each of the second passage centerlines 174.

Figure 8A:
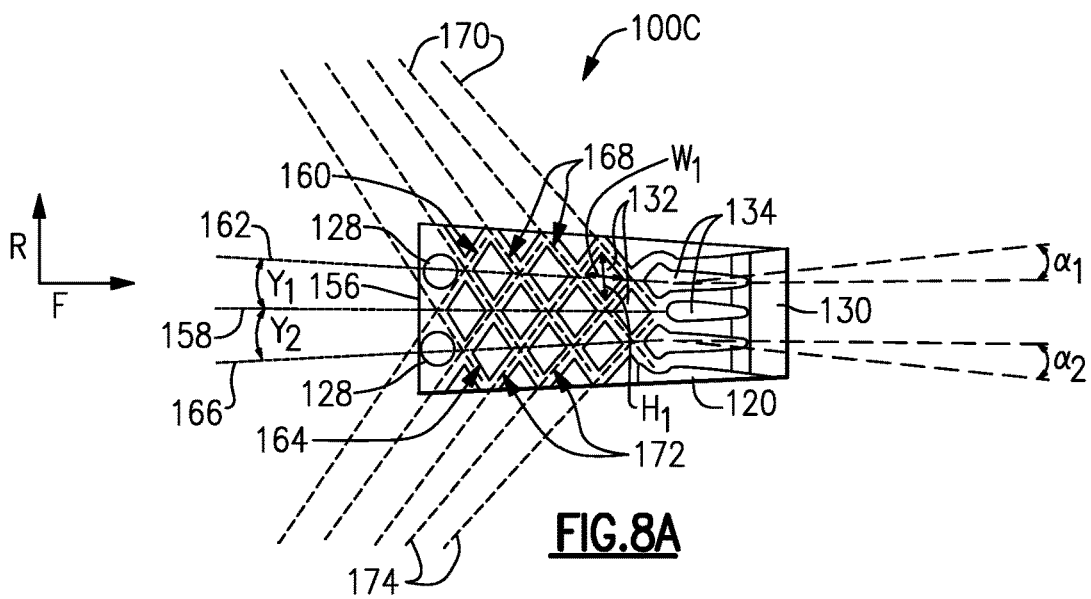
FIG. 8A is another enlarged view of the example converging cooling circuit.

One skilled in the art should recognize that the aforementioned cooling design features described to optimize the thermal cooling efficiency characteristics of the diverging cooling circuit 100D shown in FIG. 7 may also be applied to converging cooling circuit 100C similar to the one depicted in FIGS. 8 and 8A. In this instance the rate of radial convergence of the converging cooling circuit 100C is dependent on the relative angle, $\gamma_1$, formed between the passage centerline 158 and the first centerline 162 and the relative angle, $\gamma_2$, formed between the passage centerline 158 and the second centerline 166. Although the converging cooling circuit shown in FIG. 8 is axisymmetric, it should be understood that the convergence angles $\gamma_1$ and $\gamma_2$ may not be equivalent and may vary independently from one another depending on the streamwise and radial distribution of the external heat transfer coefficients, gas temperature, and local heat flux.

Figure 9:
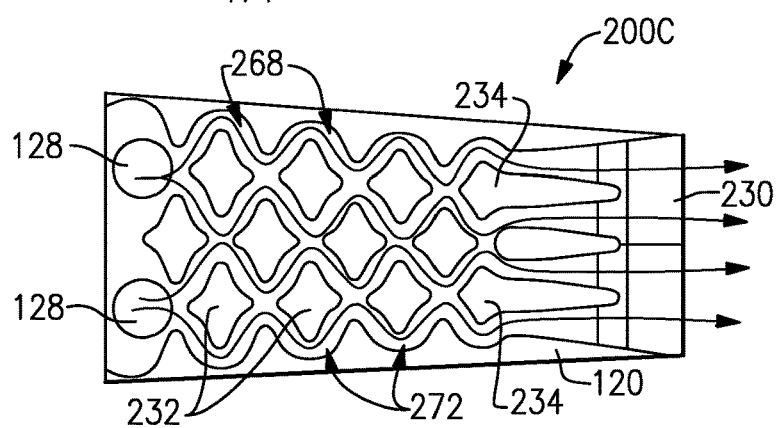
FIG. 9 is an enlarged view of another example converging cooling circuit.

FIG. 9 illustrates an enlarged view of another example converging cooling circuit 200C. The converging cooling circuit 200C is similar to the converging cooling circuit 100C except where shown in the Figures and described below. Similar numbers will be used between the converging cooling circuit 200C and the converging cooling circuit 100C but with a leading 2.

The converging cooling circuit 200C includes contoured pedestals 232 and contoured flow directing features 234 that are similar to the ones found in the converging cooling circuit 100C except with scalloped walls comprising of multiple convex and concave surfaces such that the contoured pedestals 232 and the flow directing features 234 have a scalloped star cross section. The contoured pedestals 232 also define a first plurality of cooling passages 268 and a second plurality of fluid passages 272. The upstream ones of the first and second plurality of passages 268, 272 have generally the same cross-sectional area compared to downstream ones of the first and second plurality of passages 268, 272. Although the contoured pedestals 232 and contoured flow directing features 234 are illustrated with respect to the converging cooling circuit 200C, the contoured pedestals 232 and contoured flow directing features 234 could be used in connection with the diverging cooling circuit 100D.

Figure 10:
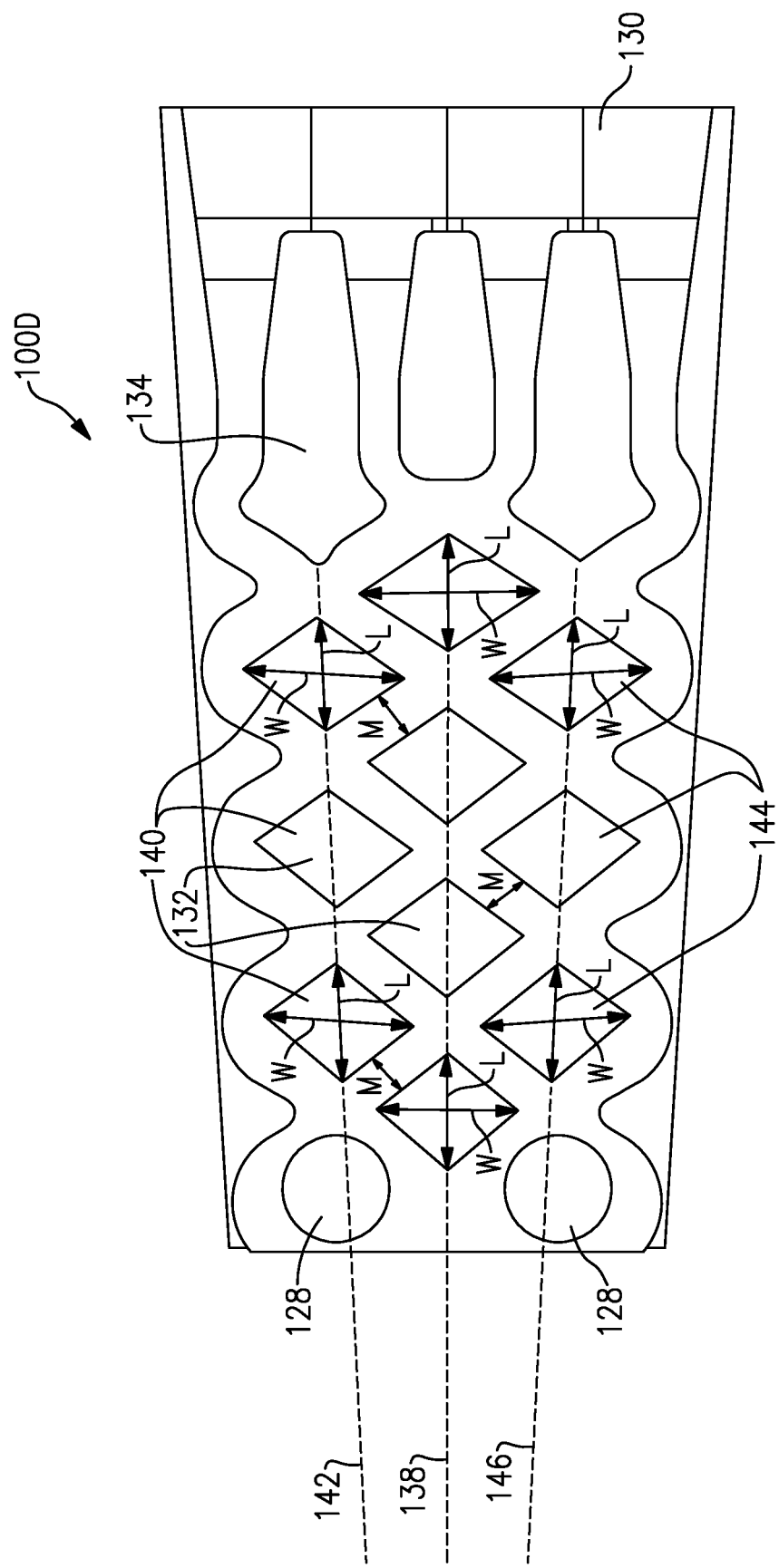
FIG. 10 is an enlarged view of the example diverging cooling circuit.
Figure 11:
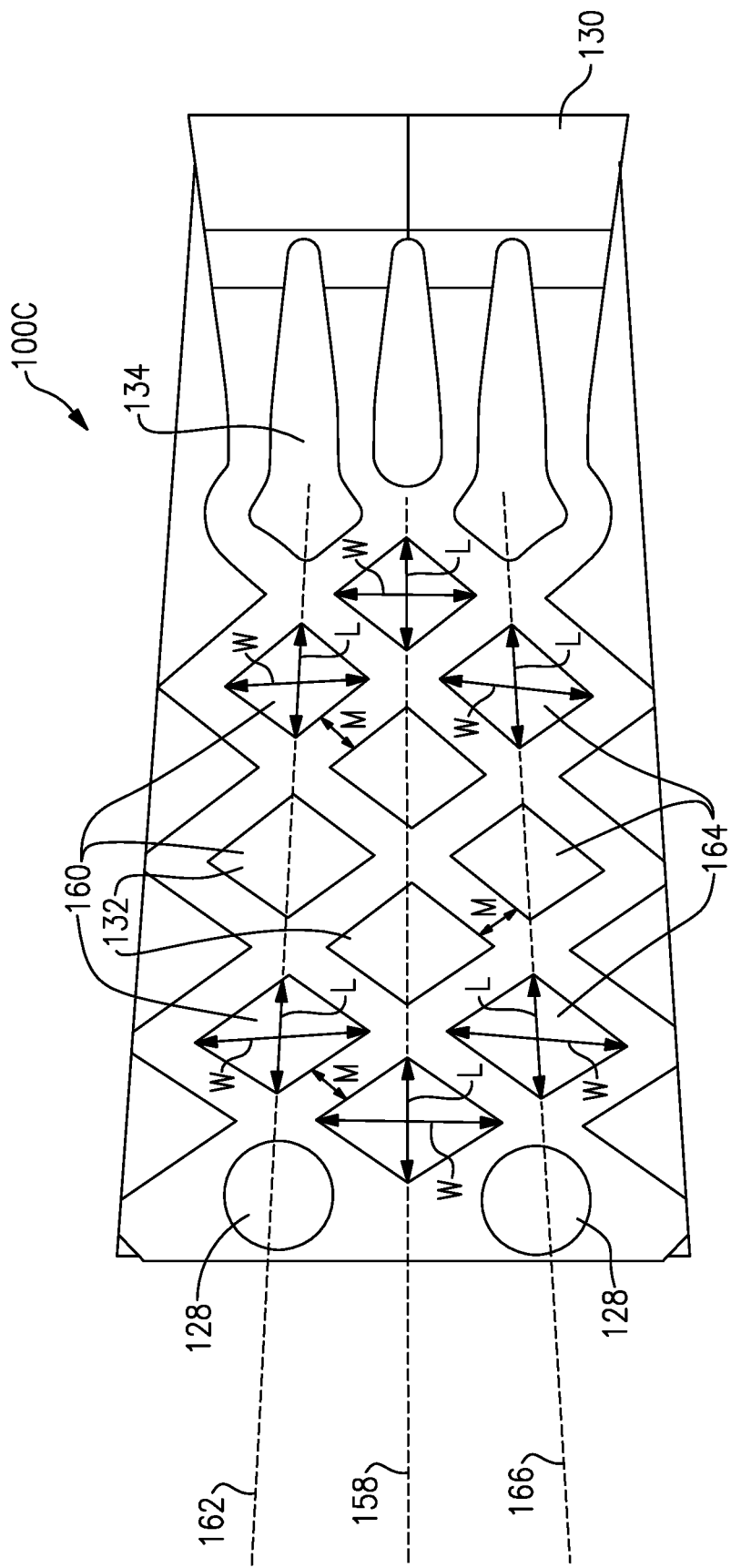
FIG. 11 is an enlarged view of the example converging cooling circuit.
Figure 12:
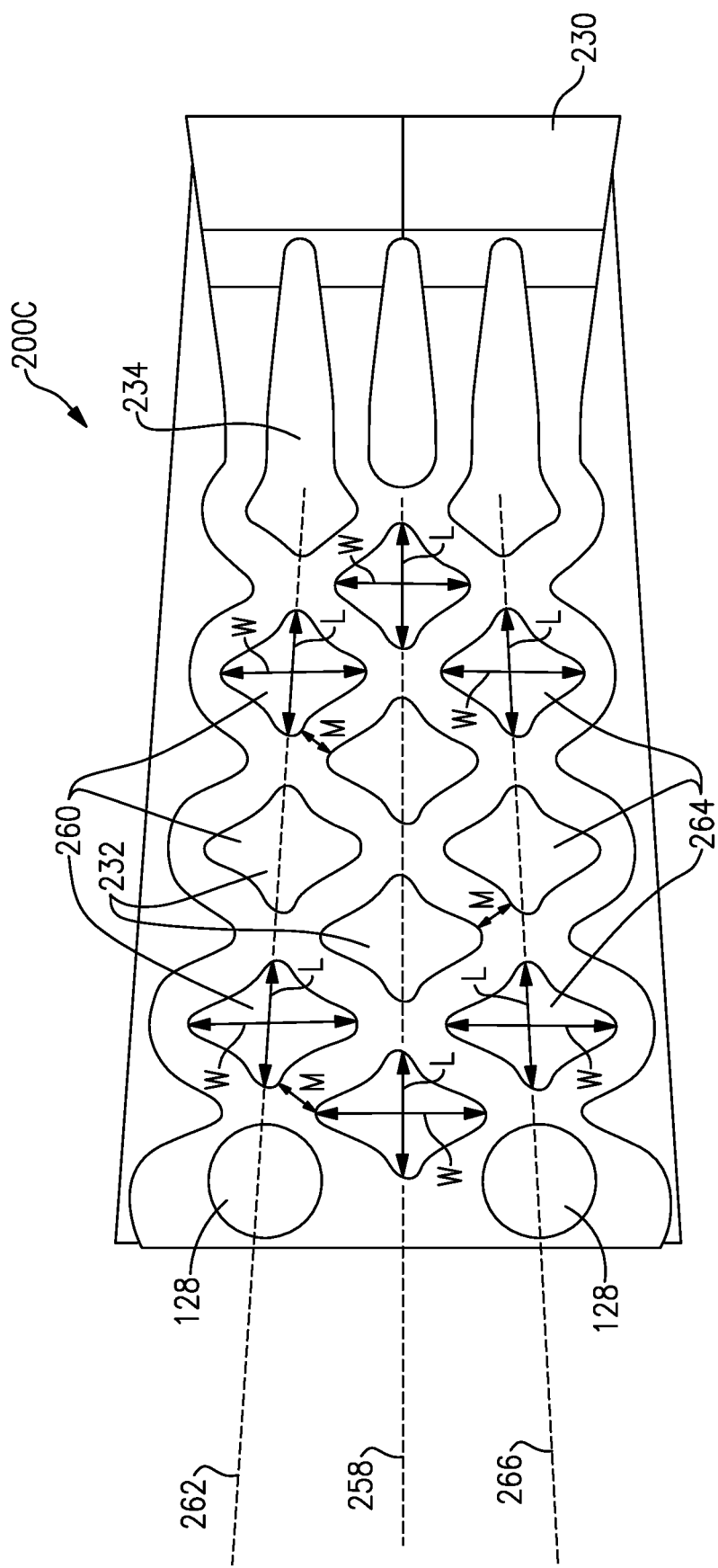
FIG. 12 is an enlarged view of the converging cooling circuit of FIG. 9.

As shown in FIGS. 10, 11, and 12, the pedestals 132 have a length L in the flow direction from inlets 128 to apertures 130 and a width W perpendicular to the length L. Each subsequent pedestal 132 in a row of pedestals 132 has the same length L. However, in the diverging cooling circuit 100D shown in FIG. 10, the width W of each subsequent pedestal 132 in the row is larger than the previous pedestal 132. In the converging cooling circuits 100C, 200C shown in FIGS. 11 and 12, the width W of each subsequent pedestal 132 in the row is smaller than the previous pedestal 132. This serves to maintain a minimum distance M between adjacent pedestals 132 that is generally constant throughout the cooling circuits 100C, 200C, 100D. By maintaining a minimum distance M between adjacent pedestals 132 throughout the converging or diverging cooling circuits 100C, 200C, 100D, the cooling passages in the cooling circuits 100C, 200C, 100D will maintain similar heat transfer coefficients throughout the cooling circuits 100C, 200C, 100D.

In addition, the pedestals 132 in the first rows 140,160 and the second rows 144, 164 are skewed and non-symmetrical about the respective centerlines 142, 162, 146, 166. In the diverging cooling circuit 100D, the pedestals 132 in the first and second rows 140, 144 are skewed such that an inner apex of each of the pedestals 132 in the first and second rows 140, 144 closest to the middle centerline 138 is upstream of an outer apex farthest from the middle centerline 138. Whereas, in the converging cooling circuit 100C, the pedestals 132 in first and second rows 160, 164 are skewed such that an inner apex of each of the pedestals 132 in first and second rows 160, 164 closest to middle centerline 158 is downstream of an outer apex farthest from middle centerline 158.

Figure 13:
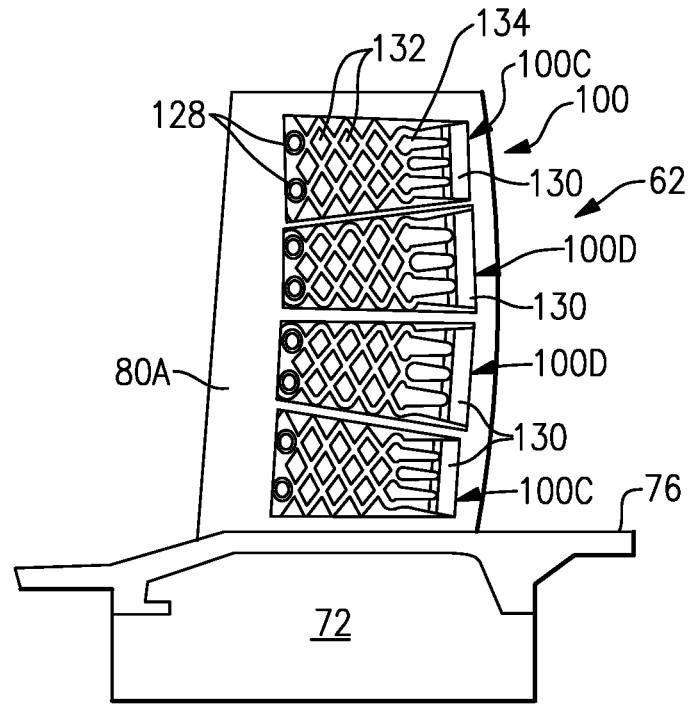
FIG. 13 illustrates the diverging and converging cooling circuits in a blade.

FIG. 13 illustrates a cross-sectional view of the airfoil 80 on the blade 62. In the illustrated example, the airfoil 80 includes a plurality of cooling circuits 100 on a pressure side 80A of the airfoil that are similar to the cooling circuits in the vane 90 described above. The cooling circuits 100 are fed by inlets 128 and include two converging cooling circuits 100C and two diverging cooling circuits 100D having respective apertures 130 extending through a pressure side of the airfoil 80.

Figure 14:
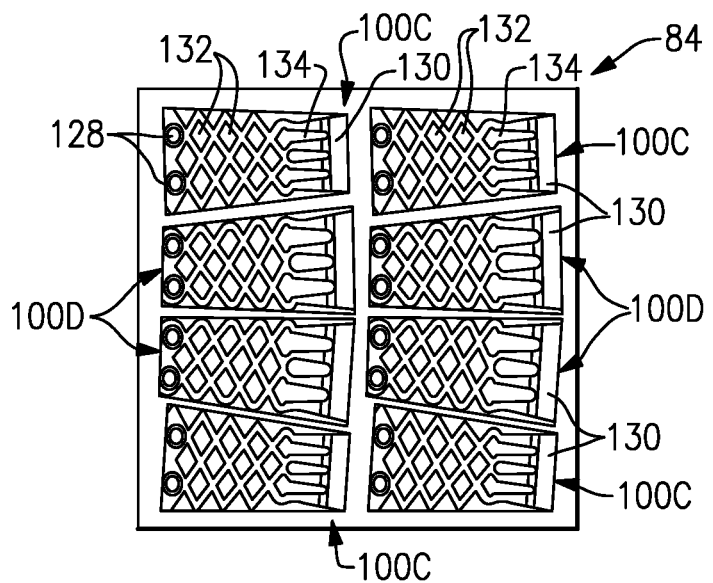
FIG. 14 illustrates the diverging and converging cooling circuits in a combustor panel.

FIG. 14 illustrates a cross-sectional view of the combustor panel 84 from the combustor section 26. In the illustrated example, the combustor panel 84 includes a plurality of cooling circuits 100 that are similar to the cooling circuits 100 in the vane 90 described above. The cooling circuits 100 can have a number of configurations and, as shown in FIG. 11, the cooling circuits 100 can be arranged in multiple rows. Each row of cooling circuits 100 in the combustor panel 84 are fed by inlets 128 and include two converging cooling circuits 100C and two diverging cooling circuits 100D each having respective apertures 130 extending through an exterior surface of the combustor panel 84. Although shown as a combustor panel, FIG. 11 can also apply to BOAS 82.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A component for a gas turbine engine comprising:
a wall portion including an interior surface and an exterior surface;
at least one cooling circuit defined by the wall portion including a plurality of pedestals extending across the cooling circuit, wherein a width of the cooling circuit decreases in a downstream direction;
at least one cooling fluid inlet extending through the interior surface and in fluid communication with the cooling circuit; and
at least one cooling fluid outlet extending through the exterior surface and in fluid communication with the cooling circuit;
the plurality of pedestals define a plurality of pedestal rows each including multiple pedestals and extending between the at least one cooling fluid inlet and the at least one cooling fluid outlet with a center row of the plurality of pedestal rows is symmetric about a middle centerline extending through a plurality of pedestals along the center row, a first row of the plurality of pedestal rows is located immediately adjacent a first side of the center row and includes a first centerline extending through a plurality of pedestals along the first row that is non-parallel to the middle centerline, and a second row of the plurality of pedestals is located immediately adjacent a second side of the center row and includes a second centerline extending through a plurality of pedestals along the second row that is non-parallel to the middle centerline; and
wherein the first centerline and the second centerline converge with the middle centerline in a downstream direction, the plurality of pedestals define a first plurality of fluid passages, each having a first centerline that converge in a forward direction and a second plurality of fluid passages, each having a second centerline that converge in the forward direction, and each pedestal in the plurality of pedestals contains a width and the width of each subsequent pedestal from the at least one cooling fluid inlet to the at least one cooling fluid outlet decreases such that a minimum distance between adjacent pedestals is constant throughout the cooling circuit.

2. The component of claim 1, wherein the wall portion defines one of a blade, a vane, a BOAS, or a combustor panel.

3. The component of claim 1, wherein the first row of pedestals and the second row of pedestals each include an outer portion that is skewed relative to an inner portion.

4. The component of claim 3, wherein the first row of pedestals and the second row of pedestals each include a scalloped star cross-section.

5. The component of claim 1, wherein a downstream edge of the component is convex and the at least one cooling circuit includes a plurality of cooling circuits each including a first centerline and a second centerline that diverge with a middle centerline in a downstream direction.

6. The component of claim 1, wherein a downstream edge of the component is convex and the at least one cooling circuit includes at least one diverging cooling circuit having a first centerline and a second centerline that diverge with a middle centerline in a downstream direction and at least one converging cooling circuit having a first centerline and a second centerline that converge with a middle centerline in the downstream direction.

7. The component of claim 1, wherein a downstream edge of the component is concave and the at least one cooling circuit includes a plurality of converging cooling circuits each having a first centerline and a second centerline that converge with a middle centerline in a downstream direction.

8. The component of claim 1, wherein the wall portion defines a pressure side wall of an airfoil having a leading edge and a trailing edge with a plurality of cooling holes located along the trailing edge and downstream from the at least one cooling fluid outlet.

9. A method of cooling a component for a gas turbine engine comprising the steps of:
directing a cooling fluid into a cooling circuit in a wall portion of component;
directing the cooling fluid around a plurality of pedestals extending across the cooling fluid circuit, wherein a width of the cooling circuit decreases in a downstream direction, wherein the plurality of pedestals includes an odd number of rows of pedestals extending between a cooling fluid inlet and a cooling fluid outlet and a center row of pedestals of the odd number of pedestal rows is symmetric about a middle centerline extending through the center row of pedestals, a first row of pedestals located immediately adjacent a first side of the center row of pedestals extends along a first centerline that is non-parallel to the middle centerline, and a second row of pedestals located immediately adjacent a second side of the center row of pedestals extends along a second centerline that is non-parallel to the middle centerline, wherein the first centerline and the second centerline converge with the middle centerline in a downstream direction, the plurality of pedestals define a first plurality of fluid passages, each having a first centerline that converge in a forward direction and a second plurality of fluid passages, each having a second centerline that converge in the forward direction, and each pedestal in the plurality of pedestals contains a width and the width of each subsequent pedestal from the at least one cooling fluid inlet to the at least one cooling fluid outlet decreases such that a minimum distance between adjacent pedestals is constant throughout the cooling circuit; and
directing the cooling fluid out of the component through a fluid outlet.

10. The method of claim 9, wherein the wall portion defines a pressure side wall of an airfoil having a leading edge and a trailing edge with a plurality of cooling holes located along the trailing edge and downstream relative to the leading edge from the cooling fluid outlet.

11. An airfoil for a gas turbine engine comprising:
a pressure side wall extending between a leading edge and a trailing edge, wherein the pressure side wall includes an interior surface and an exterior surface;
a trailing edge feed cavity and at least one upstream feed cavity;
at least one cooling circuit defined by the pressure side wall including:
a plurality of pedestals extending across the cooling circuit, wherein a width of the cooling circuit increases in a downstream direction;
at least one cooling fluid inlet extending through the interior surface and in fluid communication with the cooling circuit, wherein the inlet is in fluidly downstream of the at least one upstream feed cavity;
at least one cooling fluid outlet extending through the exterior surface and in fluid communication with the cooling circuit;
wherein the plurality of pedestals define a plurality of pedestal rows each including multiple pedestals and extending between the at least one cooling fluid inlet and the at least one cooling fluid outlet with a center row of the plurality of pedestal rows is symmetric about a middle centerline extending through a plurality of pedestals along the center row, a first row of the plurality of pedestal rows is located immediately adjacent a first side of the center row and includes a first centerline extending through a plurality of pedestals along the first row that is non-parallel to the middle centerline, and a second row of the plurality of pedestals is located immediately adjacent a second side of the center row and includes a second centerline extending through a plurality of pedestals along the second row that is non-parallel to the middle centerline; and
wherein the first centerline and the second centerline diverge with the middle centerline in a downstream direction, the plurality of pedestals define a first plurality of fluid passages, each having a first centerline that diverge in a forward direction and a second plurality of fluid passages, each having a second centerline that diverge in the forward direction, and each pedestal in the plurality of pedestals contains a width and the width of each subsequent pedestal from the at least one cooling fluid inlet to the at least one cooling fluid outlet increases such that a minimum distance between adjacent pedestals is constant throughout the cooling circuit; and
a plurality of trailing edge cooling holes located at the trailing edge and fluidly downstream of the trailing edge feed cavity.

12. The airfoil of claim 11, wherein the at least one cooling circuit includes a plurality of cooling circuits radially spaced along the pressure side wall and fluidly isolated from adjacent ones of the plurality of cooling circuits.

* * * * *